(12) United States Patent
Taylor

(10) Patent No.: US 6,715,894 B1
(45) Date of Patent: Apr. 6, 2004

(54) FORWARD-VIEWING MIRROR

(76) Inventor: Henderson O. Taylor, 6955 NW. 173rd Dr. #112, Miami, FL (US) 33015

( * ) Notice: Subject to any disclaimer, the term of this patent is extended or adjusted under 35 U.S.C. 154(b) by 0 days.

(21) Appl. No.: 10/367,152

(22) Filed: Feb. 19, 2003

(51) Int. Cl.[7] .................................................. G02B 5/08
(52) U.S. Cl. ...................... 359/862; 359/863; 359/865; 359/854
(58) Field of Search ................... 359/862, 863, 359/865, 854, 855, 856, 849, 850, 871, 872, 875; 248/479, 487

(56) References Cited

U.S. PATENT DOCUMENTS

| | | | |
|---|---|---|---|
| 1,006,315 A | 10/1911 | Toth | |
| 1,666,236 A | 4/1928 | Fuerth | |
| 2,132,026 A | 10/1938 | Griffith | |
| 2,302,952 A | 11/1942 | Pfeifer | |
| 2,374,956 A | 5/1945 | Rubissow | |
| 2,796,003 A | 6/1957 | Kaufman | |
| 4,156,557 A | * 5/1979 | Skewis | 359/855 |
| 4,253,738 A | * 3/1981 | Linkous | 359/855 |
| 4,486,075 A | * 12/1984 | Cohen | 359/840 |
| 4,531,813 A | * 7/1985 | Van den Berg | 359/862 |
| 4,685,779 A | 8/1987 | González | |
| 4,778,265 A | 10/1988 | Fingerle et al. | |
| 4,872,098 A | * 10/1989 | Romano | 362/283 |
| 5,022,748 A | 6/1991 | Espirito Santo | |
| 5,790,328 A | * 8/1998 | Strauss et al. | 359/856 |
| 5,946,149 A | * 8/1999 | Hoffman | 359/854 |
| 6,059,417 A | * 5/2000 | Tatoian | 359/856 |
| 6,247,821 B1 | 6/2001 | Brewster | |
| 6,293,681 B1 | * 9/2001 | Frank | 359/871 |

* cited by examiner

Primary Examiner—Mohammad Sikder
(74) Attorney, Agent, or Firm—Donald R. Schoonover

(57) ABSTRACT

A mirror unit having two mirrors, so the area in front of the mirror can be viewed, is adjustable in a plurality of planes to facilitate use by a wide range of users. The mirror unit can be used on a motor vehicle.

2 Claims, 5 Drawing Sheets

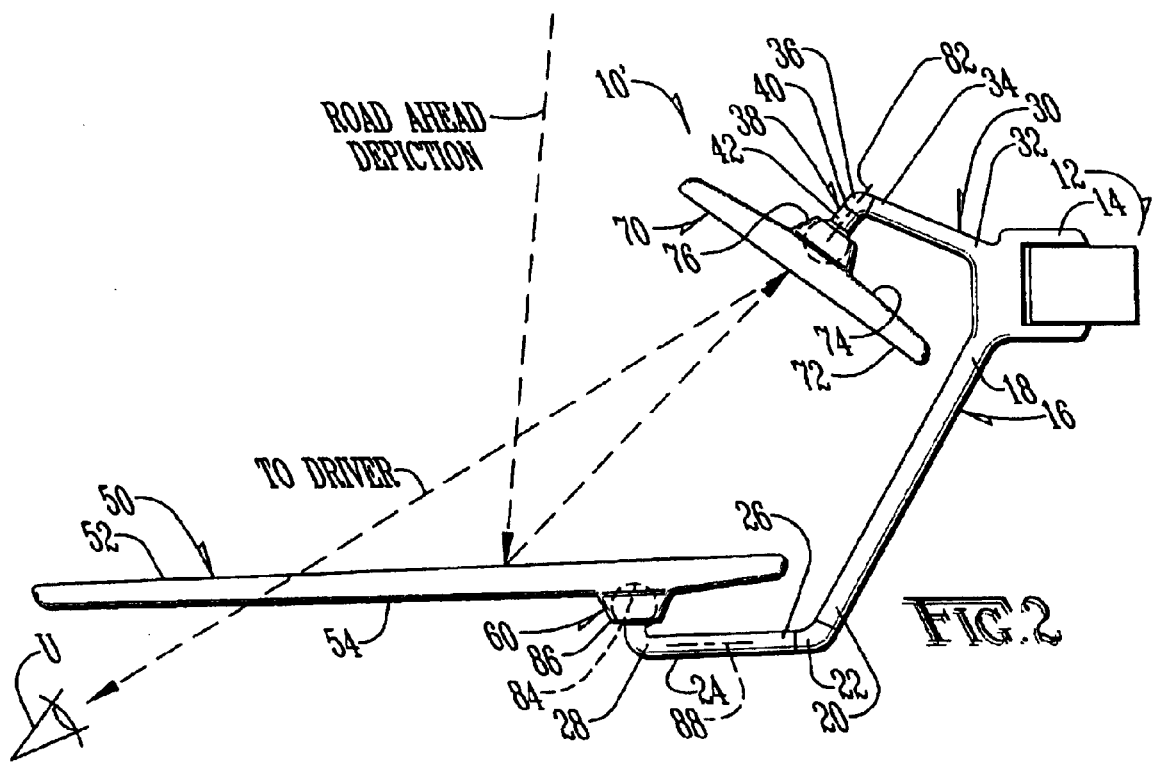
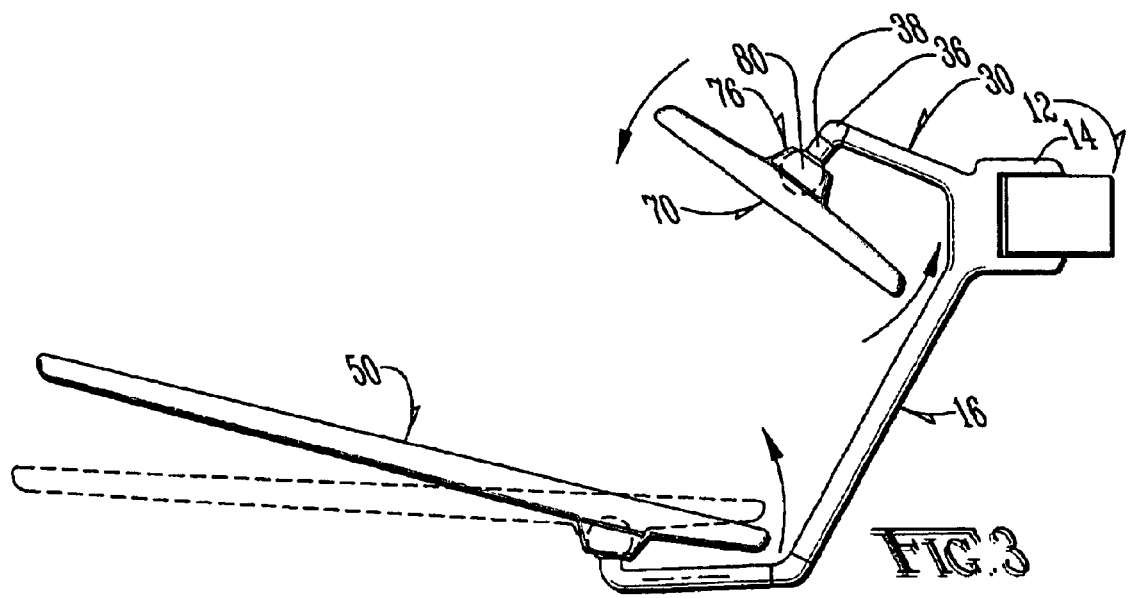

FORWARD-VIEWING MIRROR

BACKGROUND OF THE INVENTION

1. Field of the Invention

The present invention relates to the general art of motor vehicle accessories, and to the particular field of mirrors for motor vehicles.

2. Discussion of the Related Art

It is well known that safe driving of a motor vehicle requires that an operator have an adequate view of objects in the rear of the vehicle, beside the vehicle, and in front of the vehicle. Safe driving techniques generally view all of these areas several times per minute. Therefore, the motor vehicle art contains several examples of rear and side view mirrors that can be used to view the side and rear of a motor vehicle.

While very helpful, these rear and side view mirrors do not help a driver view the full field in front of the vehicle. The driver often encounters situations in which his or her view of the front of the vehicle is partially blocked. This situation occurs when following a large vehicle, such as a truck, or the like. If the driver wishes to pass such a vehicle, the driver is often forced to swerve out of the driving lane into the lane of oncoming traffic to check the road in front of the vehicle being passed. This is an undesirable situation, but is often necessary since more and more large vehicles, such as SUVs and the like, are occupying the roads.

The art does contain several examples of side mirrors that are designed to provide a driver with a view of the area in front of the vehicle. However, while effective, these devices have several shortcomings. For example, these devices are not as adjustable as possible. As a result, a short driver may not be able to take full advantage of the mirror as he or she may not be able to see the full view that could be provided by a mirror.

Therefore, there is a need for a forward-viewing mirror that is fully adjustable.

PRINCIPAL OBJECTS OF THE INVENTION

It is a main object of the present invention to provide a forward-viewing mirror for a motor vehicle.

It is another object of the present invention to provide a fully adjustable forward-viewing mirror for a motor vehicle.

SUMMARY OF THE INVENTION

These, and other, objects are achieved by a forward-viewing mirror which comprises a mirror-mounting unit which can be attached to an element of a motor vehicle; a first mirror having a reflective surface; and a second mirror having a reflective surface oriented to face the reflective surface of the first mirror. The first mirror and the second mirror are movable with respect to each other and with respect to the mirror-mounting unit in a plurality of planes.

By being movable with respect to each other in a plurality of planes, the two mirrors of the forward-viewing mirror of the present invention permits adjustment of the mirrors over a wide range. This allows the forward-viewing mirror to be used by a wide variety of people, including very short people who may not otherwise be able to take full advantage of such a mirror unit.

BRIEF DESCRIPTION OF THE DRAWING FIGURES

FIG. 2 is a top plan view of a first form of a forward-viewing mirror embodying the present invention.

FIG. 3 is a top plan view of the mirror shown in FIG. 2 illustrating some of the movements possible with the mirror of the present invention.

DETAILED DESCRIPTION OF THE INVENTION

Other objects, features and advantages of the invention will become apparent from a consideration of the following detailed description and the accompanying drawings.

Figure 1:
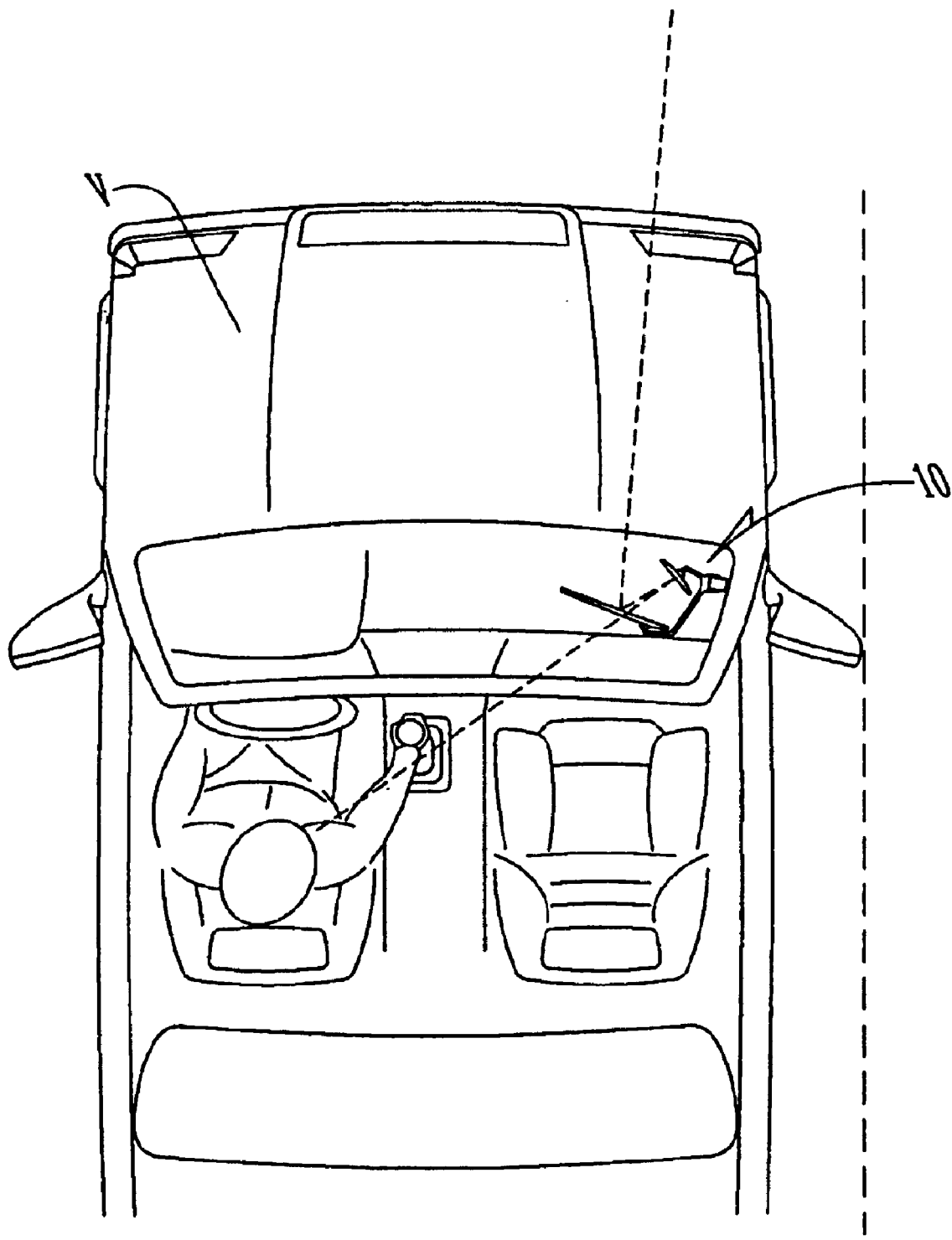
FIG. 1 is a top plan view of a motor vehicle having a forward-viewing mirror attached thereto in accordance with the teaching of the present disclosure.

Referring to the figures, the present invention is embodied in a forward-viewing mirror 10 that is placed on a vehicle, such as an automobile V in order to view around obstacles during operation of the vehicle. Forward-viewing mirror 10 is shown in FIG. 1 as being mounted on the passenger side of the vehicle, but could be mounted in any convenient location on the vehicle as will be understood by those skilled in the art.

A first form of the forward-viewing mirror is shown in FIGS. 2 and 3 as forward-viewing mirror 10'. Mirror 10' comprises a mirror-mounting unit 12 which mounts mirror 10' on an element of the vehicle. Mounting unit 12 includes a base element 14 which is mounted on an element of motor vehicle, or the like, in use.

A first arm 16 has a first end 18 connected to the base element 14 and a second end 20. A joint 22 is mounted on second end 20. Joint 22 is a swivel joint, a ball-and-socket joint, or the like. A mirror support arm 24 has a first end 26 connected to the joint 22 and a second end 28. Mirror support arm 24 is movable with respect to the first arm 16 via the joint 22.

A second arm 30 has a first end 32 connected to base element 14 and a second end 34. A joint 36, which is similar to joint 22, is located on second end 34 of second arm 30. A mirror support arm 38 has a first end 40 connected to joint 36 and a second end 42. Mirror support arm 38 on second arm 30 is movable with respect to the second arm 30 via joint 36 on the second arm 30.

A first mirror 50 has a reflective surface 52 and a rear surface 54.

A mirror joint element 60 is located on the rear surface 54 of first mirror 50 and is movably joined to second end 28 of mirror support arm 24 of first arm 16 of mirror-mounting unit 12. First mirror 50 is movable with respect to mirror support arm 24 via mirror joint element 60 on the rear surface 54 of the first mirror 50.

A second mirror 70 has a reflective surface 72 and a rear surface 74. Reflective surface 72 of second mirror 70 is oriented to face reflective surface 52 of first mirror 50.

A mirror joint element 76 is located on rear surface 74 of second mirror 70 and is movably joined to second end 42 of mirror support arm 38 of the second arm 30 of the mirror-mounting unit 12. Second mirror 70 is movable with respect to mirror support arm 38 of the second arm 30 of the mirror-mounting unit 12 via mirror joint element 76 on the rear surface 74 of second mirror 70.

First mirror 50 is larger than second mirror 70 and the first and second mirrors 50, 70 are movable with respect to each other in a plurality of planes via joint 22 on the mirror support arm 24 of the first arm 16 of the mirror-mounting unit 12 and via joint 36 on the mirror support arm 38 of the second arm 30 of the mirror-mounting unit 12 and via mirror joint element 60 on the rear surface 54 of the first mirror 50 and via joint element 76 on the rear surface 74 of the second mirror 70.

By this arrangement, the first and second mirrors 50, 70 can be adjusted with respect to each other so a user can move the mirrors 50, 70 into an orientation and a position that provides most effective use of the mirrors 50, 70 for the user, regardless of how short the user may be. As indicated in FIG. 2, reflective surface 52 provides a view of the area in front of the mirror unit 10 and reflects this image to reflective surface 72 on mirror 70. A user U views mirror 70 to see the area in front of the mirror unit 10. As can be understood, the mirrors 50, 70 should be as adjustable as possible to permit the mirrors 50, 70 to be moved into the most effective positions. The mirror embodying the present invention is movable in a plurality of planes to permit and facilitate such adjustments. Some of the adjustments that can be made for the mirror unit 10 of the present invention are indicated in FIG. 3.

Figure 4:
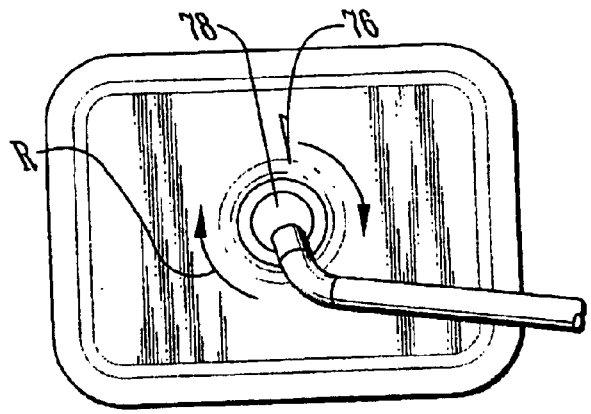
FIG. 4 shows an alternative form of the mirror embodying the present invention.

To add further versatility to the mirror unit 10 of the present invention, either joint 76 or joint 60 can be rotatable, such as shown in FIG. 4 for joint 76. Joint 76 can include a ball 78 on the second end 42 of the mirror supporting arm 38 and a socket 80 defined in rear surface 74 of mirror 70. This permits mirror 70 to rotate with respect to a longitudinal axis 82 of arm 38. This rotation is indicated in FIG. 4 by arrows R. As will be understood, joint 60 can also include a ball 84 mounted on second end 28 of arm 24 and a socket 86 defined in rear surface 54 of mirror 50 with ball 84 being rotatably captured in socket 86 so mirror 50 is rotatable with respect to longitudinal axis 88 of arm 24.

Figure 5:
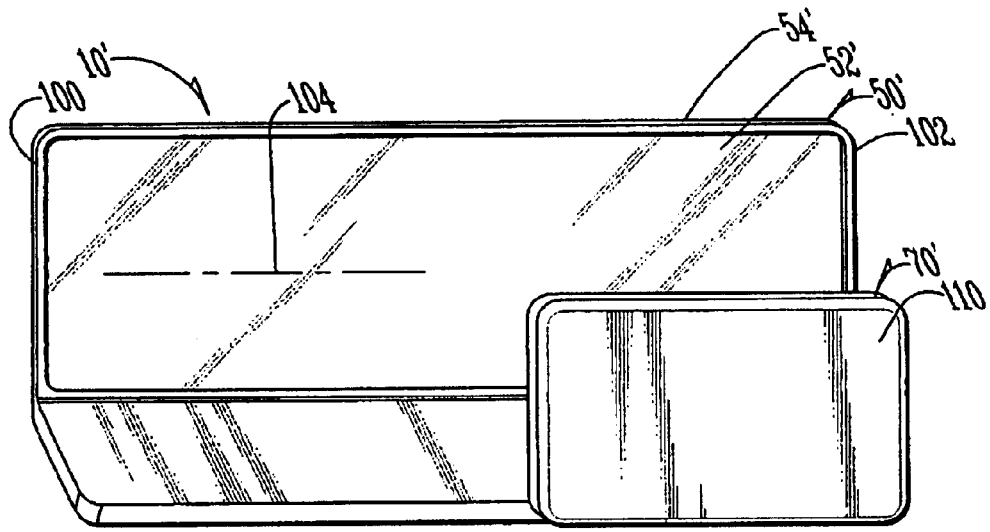
FIG. 5 shows another form of the mirror embodying the present invention.
Figure 7:
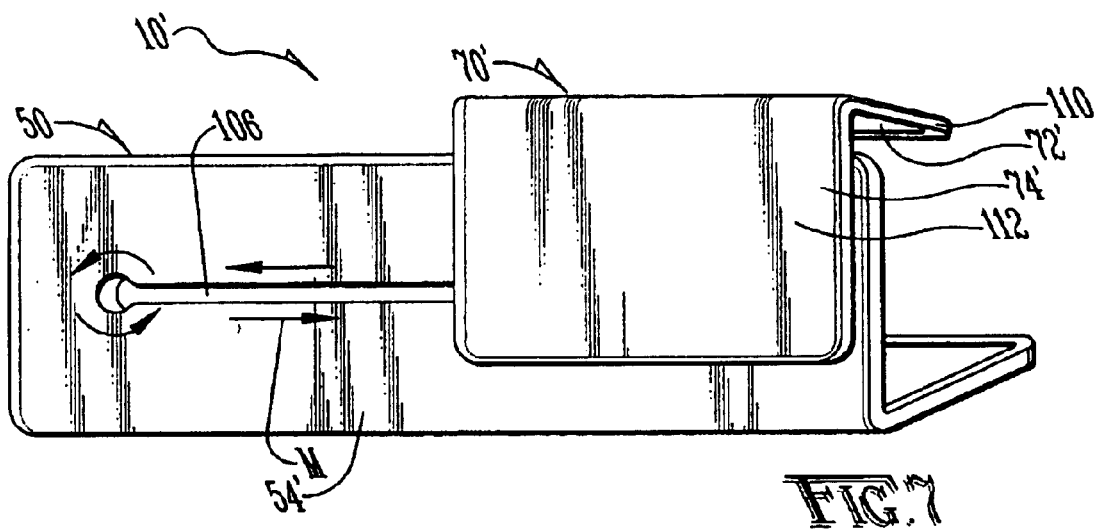
FIG. 7 shows yet another form of the present invention.
Figure 8:
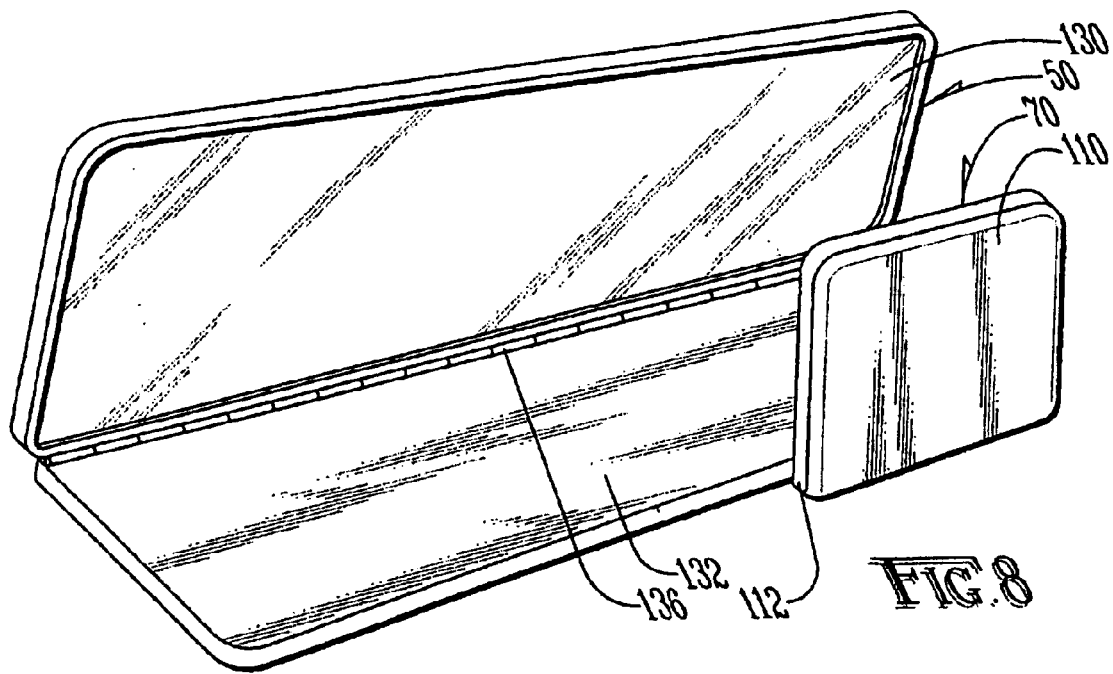
FIGS. 8–10 show still yet another form of the present invention, similar to the form shown in FIG. 7 but including a first section thereof hingeably connected to a second section thereof.

Another form of the invention is shown in FIGS. 5, 7 and 8 as forward viewing mirror 10'. Mirror 10' comprises a mirror-mounting unit similar to unit 12 shown in FIG. 2 and not shown in FIGS. 5, 7 or 8 for the sake of clarity of illustration.

Mirror 10' further includes a first mirror 50' having a reflective surface 52', a rear surface 54', a first end 100, a second end 102, and a longitudinal axis 104 extending between the first end 100 of the first mirror 50' and the second end 102 of the first mirror 50'.

A groove 106 is defined in rear surface 54' of first mirror 50' to extend in the direction of the longitudinal axis 104 of first mirror 50'.

A second mirror 70' has a reflective surface 72' oriented toward the reflective surface 52' of first mirror 50'. Second mirror 70' includes a first section 110 and a second section 112 with second section 112 being movably connected to first section 110 to be movable with respect to the first section 110.

An attachment element 114 is located on second section 112 of the second mirror 70'. The attachment element 114 is movably received in groove 106. Second mirror 70' is movable on first mirror 50' in groove 106 in the direction of longitudinal axis 104 of the first mirror 50' as indicated in FIG. 7 by arrows M.

Figure 9:
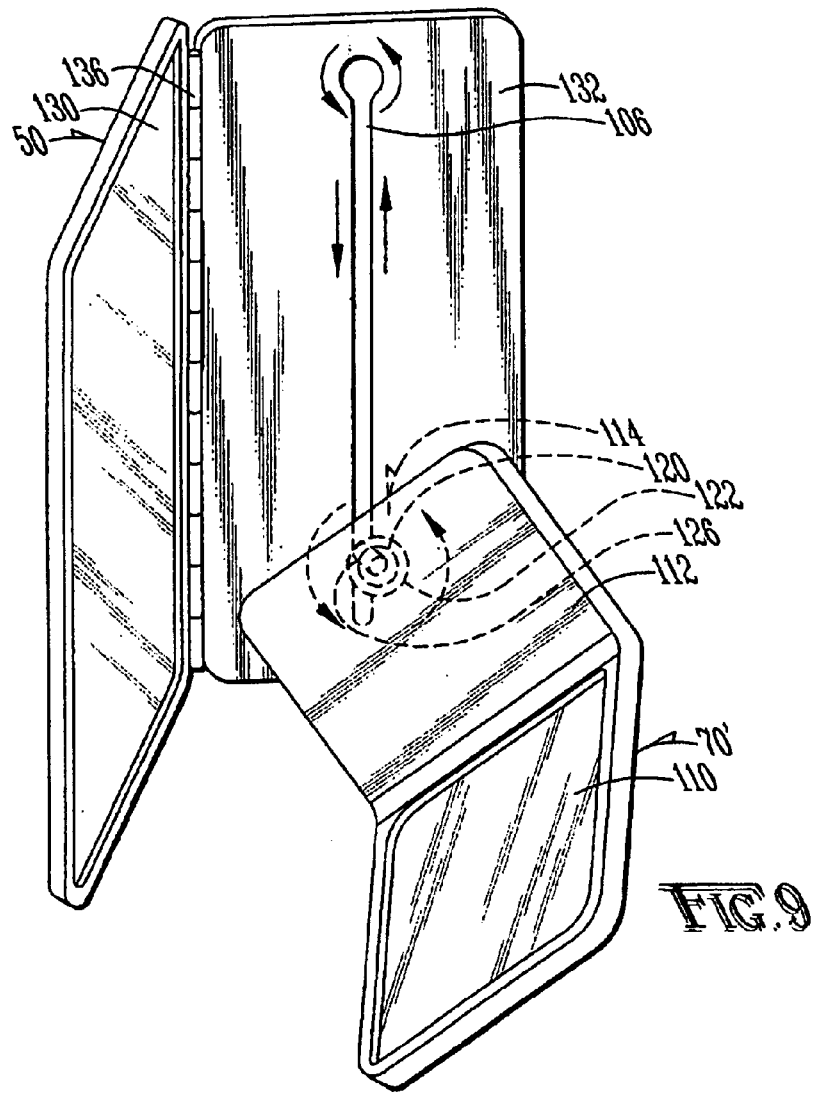
Figure 10:
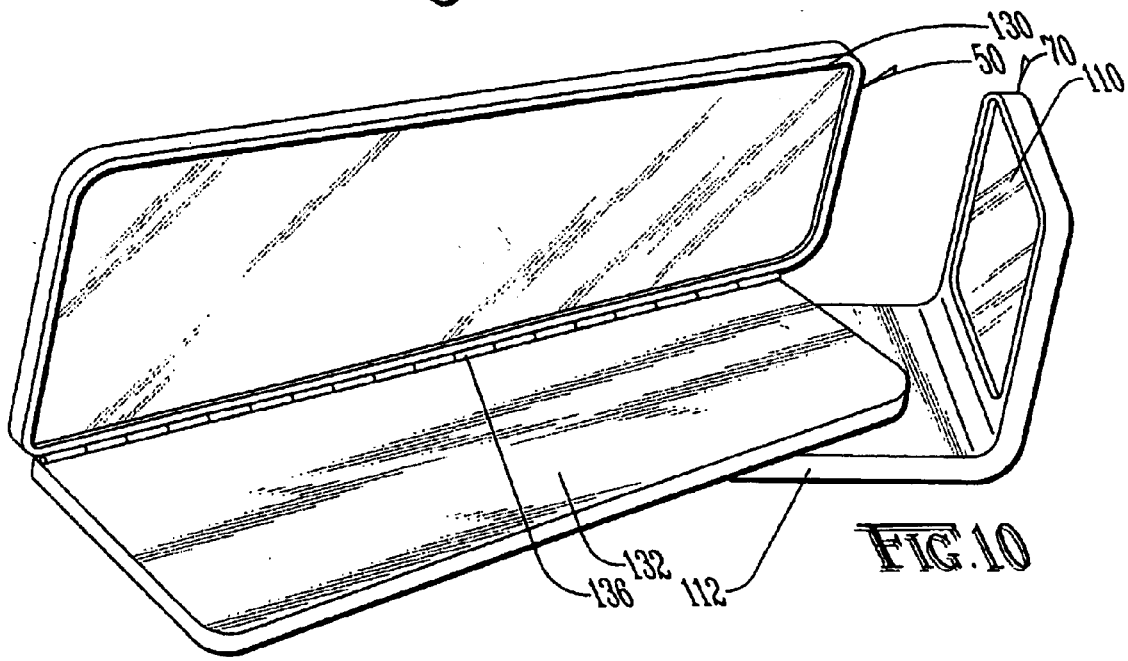

Attachment element 112 is shown in FIG. 9 as including a ball 120 in groove 106 and a socket 122 on second mirror 70', and an arm 126 attaching the ball 120 and the socket 122. This allows the second mirror 70' to rotate with respect to the first mirror 50' to provide still further freedom in adjusting the mirrors 50', 70' for the most effective use.

As shown in FIGS. 5, and 7–10, the first mirror 50' can include a first section 130 and a second section 132. These sections 130, 132 are hingeably connected together as indicated by hinge 136 in FIG. 10, to provide still further versatility to the mirror unit 10.

Figure 6:
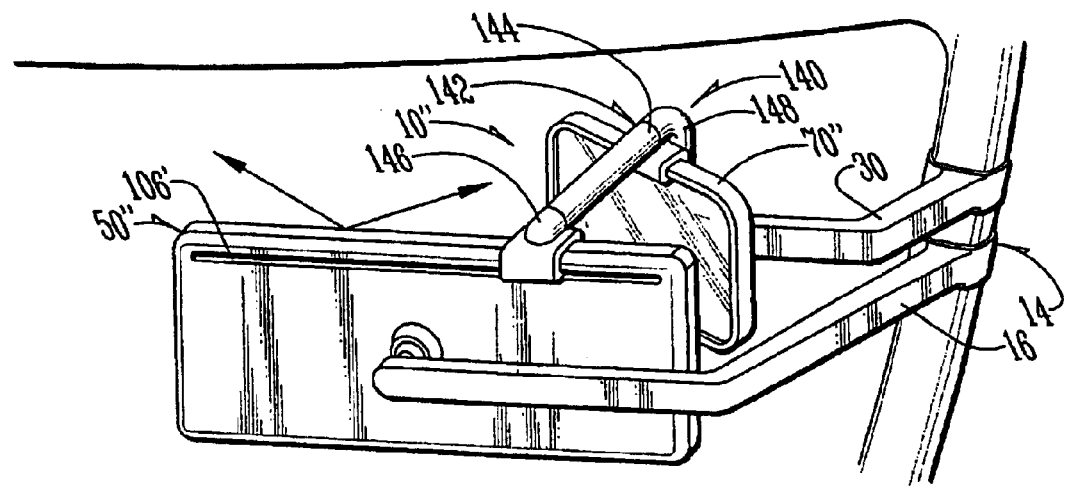
FIG. 6 shows another form of the mirror embodying the present invention.

Yet another form of the forward-viewing mirror embodying the present invention is shown in FIG. 6 as unit 10". Unit 10" comprises attachment element 140 which includes a connecting arm 142 having a first end 144, a second end 146, and a joint element 148 on the first end 144 of the connecting arm 142. Second end 146 of connecting arm 142 is movably received in groove 106' on first mirror 50". The second mirror 70" is connected to joint element 148 on the first end 144 of the connecting arm 142 and is movably connected to connecting arm 142 via joint element 148. Second mirror 70" is movable with respect to first mirror 50" in a plurality of planes via the just-described attachment element 140 and via the joint element 148 on the first end 144 of the connecting arm 142.

It is understood that while certain forms of the present invention have been illustrated and described herein, it is not to be limited to the specific forms or arrangements of parts described and shown.

What is claimed and desired to be covered by Letters Patent is:

1. A forward viewing mirror comprising:
   a) a mirror mounting unit which includes
      (1) a base element which is mounted on a rigid element of a motor vehicle in use,
      (2) a first arm having a first end connected to said base element and a second end, a first joint on the second end, and a first mirror support arm having a first end connected to the first joint and a second end, the first mirror support arm being movable with respect to the first arm via the first joint, and
      (3) a second arm having a first end connected to said base element and a second end, a second joint on the second end of the second arm wherein the second joint is spaced above the first joint, and a second mirror support arm having a first end connected to the second joint on the second end of the second arm and a second end, the second mirror support arm on the second arm being movable with respect to the second arm via the second joint on the second arm;
   b) a first mirror having a reflective surface and a rear surface;
   c) a first mirror joint element on the rear surface of said first mirror and movably joined to the second end of the first mirror support arm of the first arm of said mirror mounting unit, said first mirror being movable with respect to the first mirror support arm of the first arm of said mirror mounting unit via said first mirror joint element on the rear surface of said first mirror connecting said first mirror to the first mirror support arm of the first arm of said mirror mounting unit;
   d) a second mirror having a reflective surface and a rear surface, the reflective surface of said second mirror being oriented to face the reflective surface of said first mirror;
   e) a second mirror joint element on the rear surface of said second mirror and movably joined to the second end of the second mirror support arm of the second arm of said mirror mounting unit, said second mirror being movable with respect to the second mirror support arm of the second arm of said mirror mounting unit via said second mirror joint element on the rear surface of said second mirror;

f) said first mirror being larger than said second mirror and said first and second mirrors being movable with respect to each other in a plurality of planes via the first joint on the first mirror support arm of the first arm of said mirror mounting unit and via the second joint on the mirror support arm of the second arm of said mirror mounting unit and via said first mirror joint element on the rear surface of said first mirror and via the second joint element on the rear surface of said second mirror.

2. The forward viewing mirror as described in claim 1 wherein the first mirror support arm of the first arm of said mirror mounting unit includes a long axis extending between the first end of the first mirror support arm of the first arm of said mirror mounting unit and the second end of the first mirror support arm of the first arm of said mirror mounting unit, and further wherein said first mirror joint element on the rear surface of said first mirror includes a ball on the first mirror support arm of the first arm of said mirror mounting unit and a socket defined in the rear surface of said first mirror, said first mirror being rotatable about the longitudinal axis of the first mirror support arm of the first arm of said mirror mounting unit.

* * * * *